United States Patent
Cowell Senft

(10) Patent No.: US 6,468,635 B1
(45) Date of Patent: Oct. 22, 2002

(54) CHARGED FILMS HAVING HIGH INK ABSORBENCY FOR PRINTING ON INKJET PRINTERS

(75) Inventor: Donna S. Cowell Senft, Albuquerque, NM (US)

(73) Assignee: Permacharge Corporation, Rio Rancho, NM (US)

( * ) Notice: Subject to any disclaimer, the term of this patent is extended or adjusted under 35 U.S.C. 154(b) by 10 days.

(21) Appl. No.: 09/694,250

(22) Filed: Oct. 23, 2000

(51) Int. Cl.$^7$ .................................................. B32B 3/00
(52) U.S. Cl. ...................................... 428/195; 428/211
(58) Field of Search ................................. 428/195, 211, 428/212

(56) References Cited

U.S. PATENT DOCUMENTS 6,265,053 B1 * 7/2001 Kronzer et al. ............. 428/212

FOREIGN PATENT DOCUMENTS

WO    WO 98/52746    * 11/1998    ............. B32B/9/00

* cited by examiner

Primary Examiner—Bruce H. Hess
Assistant Examiner—Michael E Grendzynski
(74) Attorney, Agent, or Firm—Calvin B. Ward

(57) ABSTRACT

A printing composition constructed from a printing layer and a blotting layer. The printing layer has a plurality of pores connecting the top and bottom surfaces thereof and is adapted for accepting ink that is retained in the pores. The blotting layer has a top surface that is in contact with the bottom surface of the printing layer. The blotting layer is constructed from a material that has an affinity for the ink that is less than that required to remove the ink from the pores if the pores are not filled with the ink. The printing layer may be constructed from a plastic that has been coated with a surfactant that renders the sides of the pores hydrophilic. The blotting layer may be constructed from a sheet of plastic having pores therein. The blotting layer may also be constructed from a sheet of paper. In the preferred embodiment of the present invention, the printing layer is an electret.

10 Claims, 2 Drawing Sheets

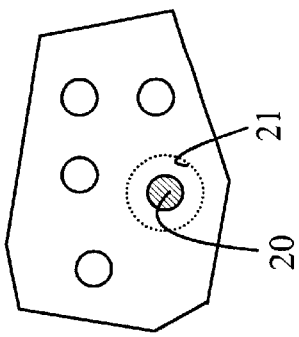
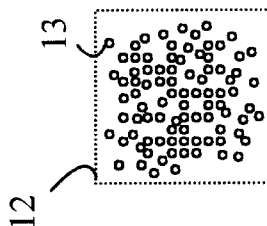
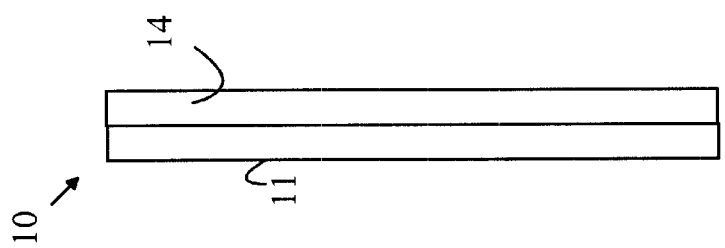
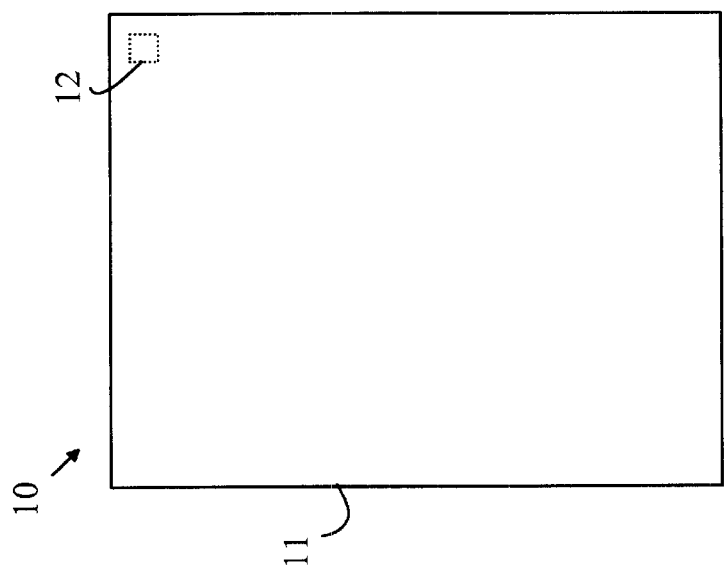
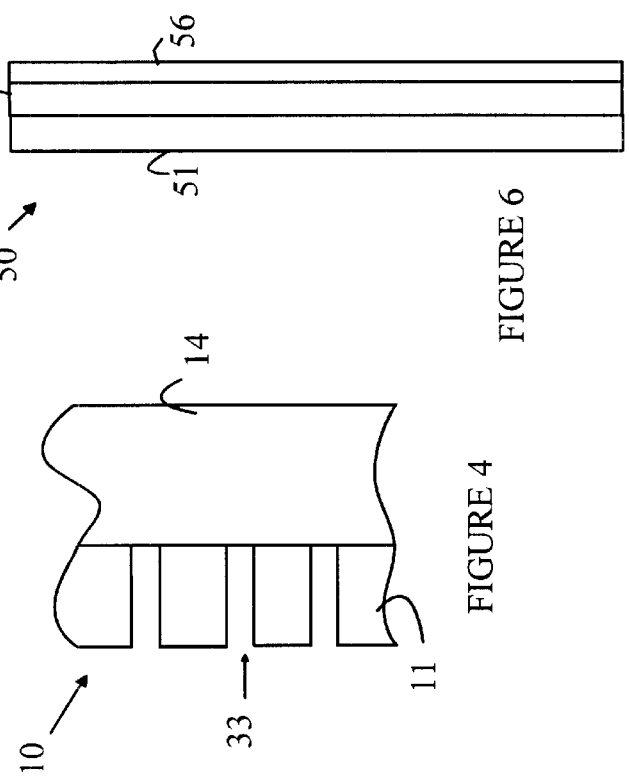
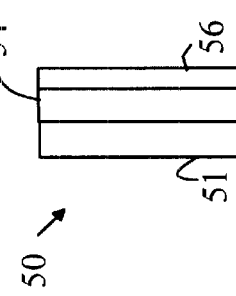

CHARGED FILMS HAVING HIGH INK ABSORBENCY FOR PRINTING ON INKJET PRINTERS

FIELD OF THE INVENTION

The present invention relates to computer printers and printing materials for use therein, and more particularly, to a computer printing material that will adhere electrostatically to non-conducting surfaces while providing sufficient ink absorbency to allow printing in inkjet printers and the like.

BACKGROUND OF THE INVENTION

Modern desktop publishing has made possible the production of one of a kind posters and other displays. A user of a conventional personal computer equipped with any one of a number of inexpensive printers can create professional quality artwork and displays. If the user also has access to a scanner, the user can input almost any type of artwork and modify the artwork for inclusion in the user's own creation. In addition to consumer art works, this type of printing is finding application in point of sale advertising in which the advertising material is printed at the store in which it is to be displayed.

While the ability to generate custom artwork has advanced rapidly, the ability to "hang" the art work has not progressed so rapidly. The options for displaying the artwork can be more or less summarized as "glue", "frame", or "project". Framing is not cost effective for many temporary displays. In addition, the frame must be mounted on the surface by a fastener or the like. Such fasteners can damage the surface.

Transparency materials for use with overhead projectors have been available for some time. Unfortunately, one needs a projector for each display. While such systems are practical for presentations to groups in business or educational settings, these systems are far from adequate in terms of serving the needs of an artist or teacher who wishes to hang a picture on a wall.

Printer compatible papers with glue backing are also known to those skilled in the publishing arts. These vary in size from small printer labels to full sized sheets. An artwork printed on an adhesive backed sheet may be stuck to a surface without the need to frame the art work or damage the surface by the application of fasteners. Unfortunately, such adhesive backed sheets have a number of problems. First, the artwork cannot, in general, be removed from one location and reapplied at another location more than a few times without the adhesive failing. In addition, some of the adhesives used in these sheets leave a residue on the surface. Furthermore, the adhesives used with some of these papers such as those used for labels are sufficiently strong that the paper may not be removed from surfaces such as glass without destroying the artwork. In some cases, the artwork must be scrapped from the surface using a razor blade or the like.

One type of material that holds the promise of providing a display that sticks to a surface without the use of fasteners or adhesives are the electrets. For the purposes of the present discussion, an electret will be defined to be a plastic sheet which carries an electrostatic charge that persists for an extended period of time. Such sheets can be generated by passing the plastic sheet through an electric field. The resulting plastic sheet will stick to most clean insulating surfaces. Furthermore, the sheet may be easily removed and reapplied to another surface.

Electret compositions for making posters have been described in the prior art. Pads of sheets are commercially sold for use during presentations as a replacement for conventional "white boards". These sheets are typically made from polypropylene, which is a few thousandths of an inch thick.

The sheets may be printed via conventional offset printing techniques. In addition, the sheets can be printed in desktop printers that employ dye sublimation or wax transfer. Unfortunately, the sheets are not suitable for printing in inkjet printers that utilize water-based inks. The ink absorbency of the sheets is too small to allow the range of color intensities needed to provide satisfactory artwork. In addition, the sheets require treatment or coatings to render the sheets sufficiently absorbent to accept the water-based inks. In principle, these problems can be overcome by providing a suitable coating on the surface of the sheets; however such sheets tend to curl as the coating expands and contracts with changes in atmospheric humidity.

One method for providing increased ink absorbency is described in U.S. Pat. No. 5,989,685, which is hereby incorporated by reference. In this invention, the ink absorbency is increased by providing an electret material that has "pits" in the surface that is to receive the ink. In addition, the surface of the sheet, including the pits, is covered with a hydrophilic coating. While this material has increased ink absorbency, it does not function well in overload situations in which the amount of ink that is deposited at any location is significantly greater that the volume of the pit at that location. The excess ink tends to overflow from the pit and spread over the surface of the printing sheet.

Broadly, it is the object of the present invention to provide an improved printing material that incorporates the advantages of electrets.

It is another object of the present invention to provide a printing material that may be printed in inkjet printers without expensive coating materials.

These and other objects of the present invention will become apparent to those skilled in the art from the following detailed description of the invention and the accompanying drawings.

SUMMARY OF THE INVENTION

The present invention is a printing composition constructed from a printing layer and a blotting layer. The printing layer has a plurality of pores connecting the top and bottom surfaces thereof and is adapted for accepting ink that is retained in the pores. The blotting layer has a top surface that is in contact with the bottom surface of the printing layer. The blotting layer is constructed from a material that has an affinity for the ink that is less than that required to remove the ink from the pores if the pores are not filled with the ink. The printing layer may be constructed from a plastic that has been coated with a surfactant which renders the sides of the pores hydrophilic. The blotting layer may be constructed from a sheet of plastic having pores therein. The blotting layer may also be constructed from a sheet of paper. In the preferred embodiment of the present invention, the printing layer is an electret.

BRIEF DESCRIPTION OF THE DRAWINGS

FIG. 1 is a top view of printing material 10 according to the present invention.

FIG. 2 is a side view of printing material 10.

FIG. 3 is an enlarged view of region 12 shown in FIG. 1.

FIG. 4 is an enlarged cross-sectional view of a portion of sheet 10.

FIG. 5 is an enlarged top view of a portion of a printing sheet according to the present invention.

FIG. 6 is a cross-sectional view of a second embodiment of a printing composition according to the present invention.

DETAILED DESCRIPTION OF THE INVENTION

Figure 7:
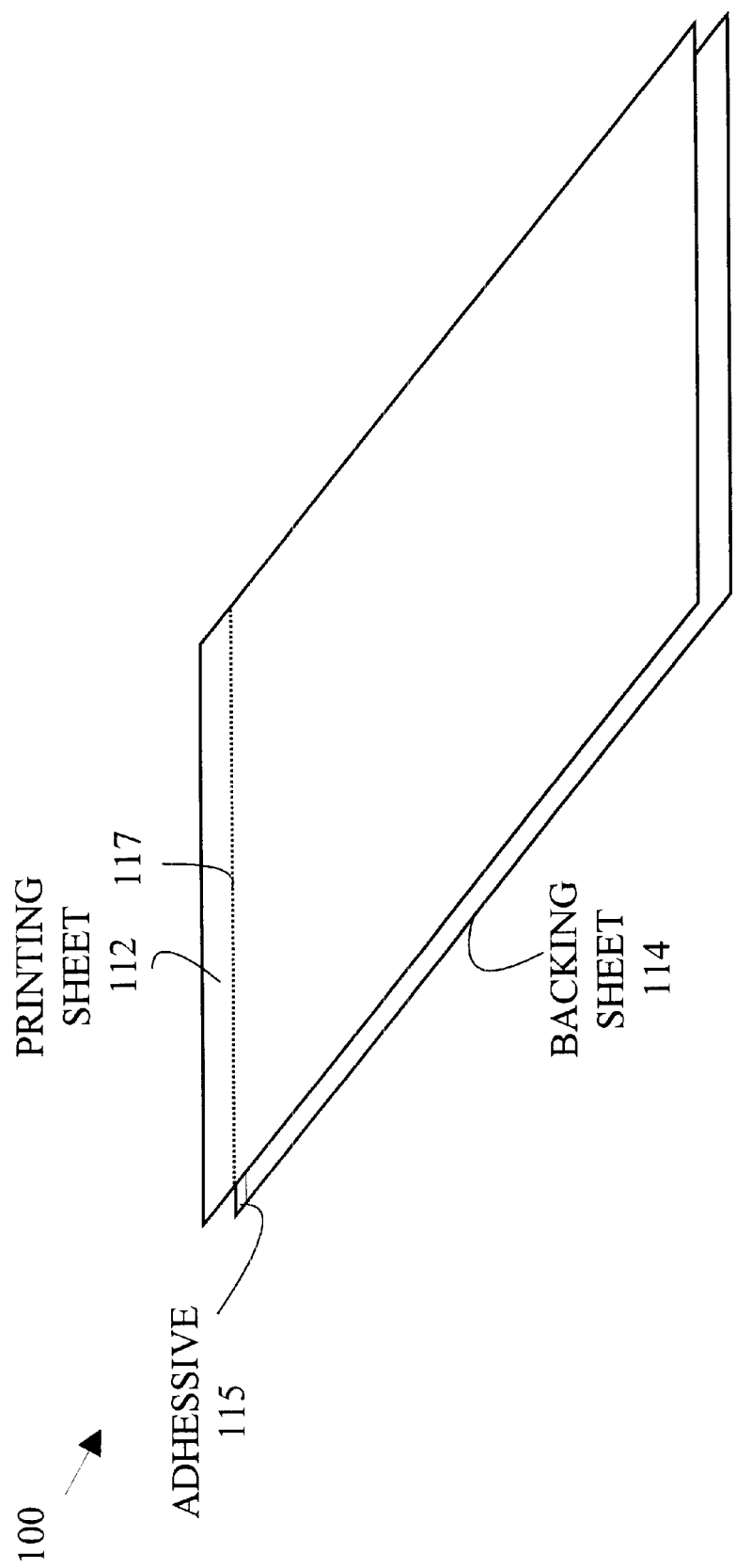
FIG. 7 is a perspective view of a printing composition according to the present invention having a printing sheet and a backing sheet.

The present invention may be more easily understood with reference to FIGS. 1–4. FIG. 1 is a top view of printing material 10 according to the present invention. FIG. 2 is a side view of printing material 10. FIG. 3 is an enlarged view of region 12 shown in FIG. 1. FIG. 4 is an enlarged cross-sectional view of a portion of sheet 10. Printing sheet 10 is constructed from two layers shown at 11 and 14. The first layer 11 has pores 13 that extend through the sheet and will be referred to as the "printing layer". The pores accept ink and retain the ink by capillary action. The second layer 14 acts as a "blotter" that absorbs any ink that overflows from the pores and will be referred to as the "blotting layer".

Refer now to FIG. 5 which is an enlarged top view of a portion of a printing sheet according to the present invention showing a pore 20 that has been filled to the overflow point with ink. The excess ink is absorbed by the blotting layer and may extend beyond the boundaries of pore 20 as shown in phantom at 21. The first layer is preferably opaque, and hence, any ink that overflows from the pores will not be visible unless the overflow volume is so large as to cause the overflow spot to extend to neighboring pores. However, embodiments in which the first layer is transparent can also be practiced. In this case, the resolution of the image will be somewhat less; however, the image will have a more continuous appearance.

To assure that the blotter only takes up ink that overflows from the pores, the affinity of the blotter layer for the ink must be less than that of the pores. Ink is primarily bound in the pores by capillary action. Hence, the blotter layer must bind the ink with a force that is less than that of the capillary force holding the ink in the pores. If this condition is met, ink will only flow out into the blotter layer when the pores become completely filled. As will be explained in more detail below, the blotter layer may be constructed from a material that also has pores. Since the capillary binding forces depend on the diameter of the pores, this condition can be met if the material of the two sheets is chemically the same and the pores in the blotter layer are larger than those in the printing layer.

In the preferred embodiment of the present invention, the printing sheet is constructed by laminating the printing layer to the blotter layer. The printing layer can be constructed from a suitable plastic sheet with pores of the appropriate size. Polypropylene sheets with pores of very uniform sizes can be constructed utilizing etching solutions applied to the sheets after the sheets have been bombarded with high-energy ions. Each charged particle damages the bonds in the plastic along its trajectory. The damaged area is then etched to form a cylindrical pore having an axis that is perpendicular to the surface of the sheet and a diameter that is controlled by the etching conditions.

Radiation damage etching of this type is well known to those in the art, and hence, will not be discussed in detail here. However, to clarify the preceding discussion, one example of a radiation damage process that has been found to provide satisfactory plastic sheets will be described.

In one preferred embodiment of the present invention, polypropylene sheets are used as the starting material. The sheets are irradiated with fission fragments from $U^{235}$. These ionized fission fragments have roughly 1.93 MeV per Nucleon in kinetic energy. Typical ions are $Zr^{91}$ with 77 MeV of kinetic energy and La139 with 110 MeV of kinetic energy. The range of these charged particles in the plastic is roughly 10 $\mu$m. The preferred dose levels are in the range of $1\times10^5$ to $1\times10^9$ particles per $cm^2$. The particle dose level and subsequent etch duration are used to control the porosity of the plastic.

The irradiated plastic sheets are exposed to oxygen for a period of time sufficient to oxidize the plastic along the damaged track. The oxidized sheets are then etched at 94° C. in a sulfuric acid potassium dichromate solution (87% by weight, 30% sulfuric acid, and 12.6% potassium dichromate ($K_2Cr_2O_7$)) for a period of time determined by the desired hole diameter.

Plastic sheets having pores therethrough are also well known in the disposable diaper arts. Such sheets are mass-produced for use as liners to separate the absorbent diaper material from the baby's skin. A suitable porous polypropylene material having a thickness of approximately 38 $\mu$m may be obtained from 3M Corporation (Product Number 55144-1000). The porous printing layer may be bonded to a blotting layer of another sheet of polypropylene using an adhesive consisting of 1 part Crodalam 29–103 and 7 parts Crodalam 29–102 (Croda Adhesives, Inc., 1000 Hollywood Ave, Itasca, Ill. 60143). The bonded sheets are then polled as described below.

A material consisting of two laminated porous plastic sheets with different pores sizes may also be purchased from 3M under the product name of Propore™. This material is used in outdoor wear. Hence, Propore is specially treated to be hydrophobic so that water vapor can pass through the pores, but liquid water cannot. The layers are thermally welded together. While this material is not suitable for printing as currently manufactured, it can be converted to a suitable material by treating the material to make it hydrophilic.

As noted above, the blotting layer can be constructed from another sheet of plastic having pores of a larger diameter and/or a reduced affinity for the solvent used in the ink. In addition, the blotting layer can be constructed from a sheet of paper.

In general, the plastic sheets have surfaces that are hydrophobic, and hence, poorly suited for receiving water-based inks. While the plastic sheets will absorb ink, the absorption is limited by the hydrophobic nature to the starting material. In the preferred embodiment of the present invention, the plastic is treated further to render the surface hydrophilic if the particular etchant used has not already rendered the surface sufficiently hydrophilic. The surface may be rendered hydrophilic by coating the surface with a surfactant. A surfactant can be added to the etching solution or the plastic sheets can be coated with a surfactant after the etching solution has been rinsed from the plastic sheets. Dawn™ soap dissolved in 95% water is suitable for coating the rinsed sheets. A solution of 1 part soap to 20 parts water has been found to be satisfactory. Other surfactants or wetting agents may be used. For example, a detergent such as Triton™ or sodium laureth sulfate (for example, Witcolate™ from Witco Corporation) may be used in place of the soap.

The printing layer and blotting layer may be bonded by a number of methods. If both of the layers are plastic, the sheets can be bonded by solvent welding, heat welds, or a suitable adhesive as described above. If the blotting layer is constructed from a sheet of paper, a layer of adhesive is preferred. The laminated layers can then be charged to form an electret.

The laminated layers are converted to electrets after drying by heating and preferably stretching the sheets in a polling electric field. In the preferred embodiment of the present invention, the plastic sheet is passed through heated rollers, stretched as it exits the rollers, and a DC corona is discharged through the plastic normal to the plastic surface as it cools. This process electrostatically poles the plastic to make it a permanent electret. The amount of polling can be adjusted by adjusting the polling voltage, maximum temperature in the plastic film, and amount of stretch in the plastic. The film is heated to a temperature ranging from 60° C. to 120° C. depending upon the type specific film composition.

The charging phase can be accomplished by a number of methods. These include, but are not limited to, (1) AC or DC Corona discharge, (2) simple polarization in a strong DC or AC field, (3) plasma treatment, and (4) combinations of the above three. In a preferred embodiment, the film is treated with a DC corona discharge at a potential of between 5 KV and 30 KV.

If water-based inks are used to print on the printing layer after it has been charged, some of the applied charge will be lost. In embodiments of the present invention that are designed to adhere to a surface with the printing side facing out, i.e., the blotting layer nearest the wall, additional adhesion can be provided by including a third layer of plastic on the other side of the blotting layer from the printing layer as shown in FIG. 6. Printing composition 50 includes a printing layer 51, a blotting layer 54, and an adhesion layer 56. Adhesion layer 56 is bonded to blotting layer 54 and is constructed from a plastic that can be polled. Adhesion layer 56 may be polled either before or after bonding to blotting layer 54. If adhesion layer 56 is bonded to blotting layer 54 prior to being polled, it can be polled at the same time printing layer 51 is polled. Since blotting layer 54 intercepts any excess ink, and thus prevents the ink from reaching adhesion layer 56, the charge on adhesion layer 56 will not be disturbed in the printing process.

The thickness of the printing sheet consisting of the various layers discussed above is preferably as small as possible consistent with maintaining dimensional stability in the final printed sheet. The electrostatic force that is available for affixing the sheet to a vertical surface is determined by the surface area of the sheet, while the force tending to remove it from the surface is determined by the weight of the sheet which is proportional to the thickness of the sheet. Hence, thinner sheets will, in general, stay affixed to a vertical surface longer than thicker sheets. In addition, the cost of the materials increases with the thickness of the printing sheet.

Very thin sheets, however, will not feed properly through the paper feed mechanisms of ink jet printers and the like. For example, printing sheets having a thickness between 0.1 mil and 5 mils will adhere to vertical surfaces; however, polypropylene sheets in this thickness range are too flexible to pass through the paper handling system used in most computer printers. Accordingly, a backing sheet can be added to the printing sheet to provide dimensional stability to the printing sheet during the printing process. In addition, the backing sheet helps to isolate the printing sheets so that they do not stick together.

The optimal thickness for the backing sheet is determined by the thickness of the printing sheet and the optimal thickness for the sheet feeder on the printer. Most printers are designed for a maximum sheet thickness. The combined thickness of the electret printing sheet and the backing sheet must be less than this maximum thickness. The minimum thickness for the backing sheet is determined by the degree of rigidity required by the paper feed of the printer. Thicker backing sheets provide higher degrees of rigidity; however, thicker backing sheets increase cost. In the preferred embodiment of the present invention, the thickness of the backing sheet is chosen such that the combined thickness of the backing sheet and the electret sheet is close to the optimal thickness for the printer feed mechanism. For example, in one preferred embodiment of the present invention the printing electret sheet consists of a 2.5 mil sheet of laminated polypropylene backed with a 5 mil sheet of paper. In general, paper sheets in the 1 mil to 10 mil range may be used as the backing sheets or the blotting layer.

Refer now to FIG. 7 which is a perspective view of a printing composition 100 according to the present invention having a printing sheet 112 and a backing sheet 114. The backing sheet can be affixed to the printing sheet by a small area of adhesive such as shown at 115. In general, the electret printing sheet will adhere to the backing sheet by electrostatic forces. The adhesive area provides some additional stability between the backing sheet and printing sheet. A line of perforations 117 may be included in the printing sheet to facilitate the separation of the sheets after printing. Alternatively, an adhesive that allows separation of the sheets may be utilized. Such adhesives are used in "sticky" notes, and the like.

Embodiments in which the paper backer also serves the function of the blotting layer can also be constructed. In such embodiments, the printing layer consisting of a thin, electrostatically-charged plastic sheet with pores of the appropriate diameter is affixed to the backing sheet. If the paper backer is chosen to have the correct degree of affinity for the ink used in the printing process, the excess ink will be absorbed by the backer. After the ink has dried, the backer can be removed together with the excess ink. The printing layer can then be affixed to the wall.

As noted above, the degree of affinity of the printing sheet for the ink can be adjusted by controlling the diameter of the pores. In general, there will be a critical pore diameter. For diameters less than this diameter, ink will only leave the printing sheet and enter the blotting layer if a pore is full of ink.

The diameter of the pores is also important in printing sheets in which a transparent printing sheet is utilized. Such sheets are most effective in embodiments of the present invention in which the blotting layer is provided by the backing sheet. If the pore diameter is substantially less than the wavelength of visible light, the pores will "disappear". Pore diameters of 20 nm or less are preferred.

While the above-described embodiments of the present invention have utilized polypropylene plastic sheets, other types of plastics may be utilized. For example, electrets can also be constructed from polycarbonate and polyethylene.

While the above-described embodiments of the present invention have utilized an electrostatically charged printing sheet, it will be appreciated that the present invention also provides advantages that can be realized with non-electrostatically charged sheets. The present invention provides a printing sheet that will not run or generate printing artifacts when more ink is applied than the printing layer can absorb.

Various modifications to the present invention will become apparent to those skilled in the art from the foregoing description and accompanying drawings. Accordingly, the present invention is to be limited solely by the scope of the following claims.

What is claimed is:

1. A printing composition, comprising:
    a printing layer having top and bottom surfaces, said printing layer having a plurality of pores connecting said top and bottom surfaces, said printing layer accepting ink that is retained in said pores; and
    a blotting layer having a top and bottom surface, said top surface being in contact with said bottom surface of said printing layer, said blotting layer being constructed from a material having an affinity for said ink that is, less than that required to remove said ink from said pores if said pores are partially filled with said ink but greater than that required to remove ink from said pores when said pores are filled with ink.

2. The composition of claim 1 wherein said printing layer is coated with a surfactant which renders the sides of said pores hydrophilic.

3. The composition of claim 1 wherein said printing layer comprises a sheet of plastic.

4. The composition of claim 3 wherein said plastic is chosen from the group consisting of polypropylene, polycarbonate, and polyethylene.

5. The composition of claim 1 wherein said printing layer comprises a sheet of plastic in which said pores have a first diameter and wherein said blotting layer comprises a sheet of plastic having a plurality of pores of a larger diameter.

6. The composition of claim 1 wherein said blotting layer comprises a sheet of paper.

7. The composition of claim 1 further comprising a backing sheet, said backing sheet being in contact with said surface of said bottom surface of said blotting layer.

8. The composition of claim 7 wherein said backing sheet comprises a sheet of paper.

9. The composition of claim 1 wherein said printing layer comprises an electret.

10. The composition of claim 1 further comprising an adhesion layer bonded to said blotting layer, said adhesion layer comprising an electret, said blotting layer lying between said adhesion layer and said printing layer.

* * * * *